Jan. 31, 1950     W. A. FLUMERFELT     2,495,959
STEERING ARM JOINT ASSEMBLY UNIT
Filed May 11, 1946
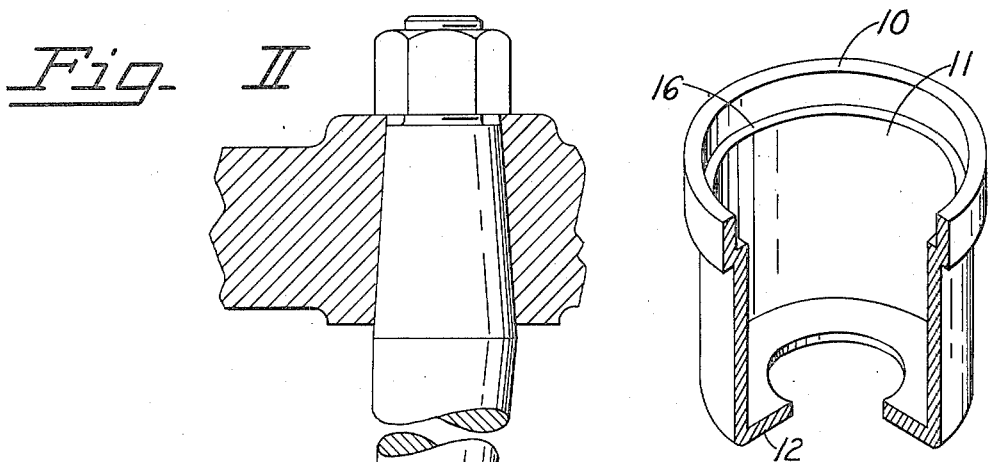
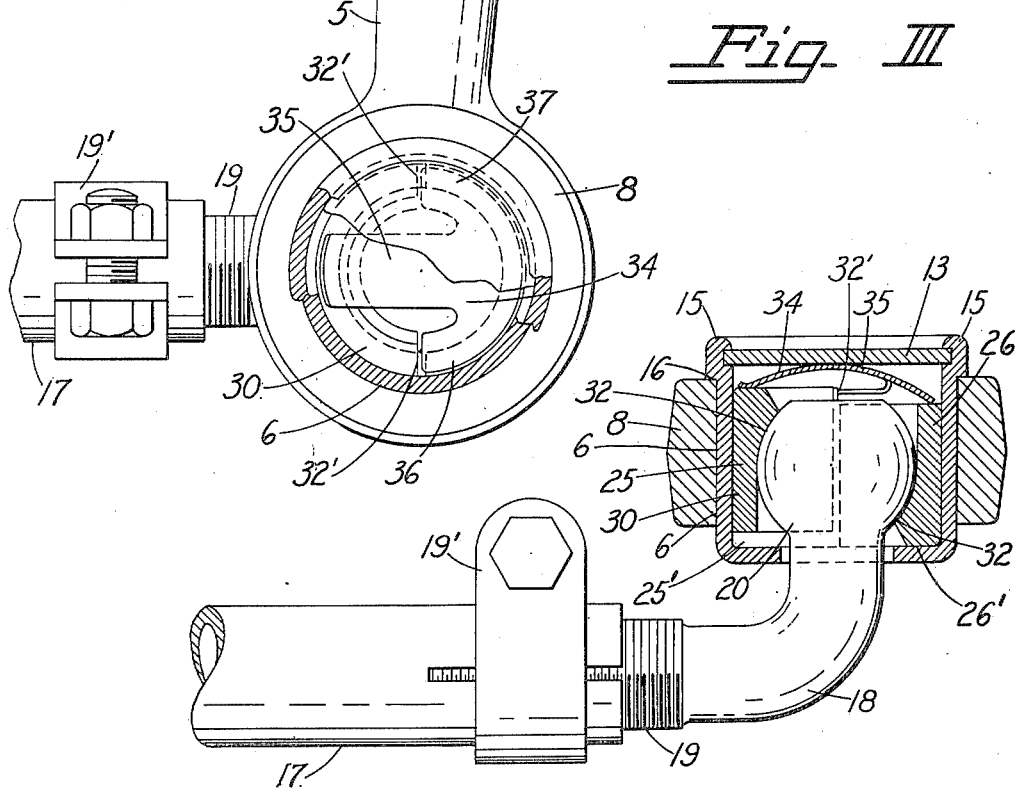

Patented Jan. 31, 1950

2,495,959

UNITED STATES PATENT OFFICE 2,495,959

STEERING ARM JOINT ASSEMBLY UNIT

William A. Flumerfelt, Columbus, Ohio, assignor to The Columbus Auto Parts Company, Columbus, Ohio, a corporation of Ohio Application May 11, 1946, Serial No. 669,171

2 Claims. (Cl. 287—90)

This invention relates to tie rod joints and has for an object to provide an efficient automatic compensation means for looseness in a small space adapted to be readily assembled in the motor vehicle.

A further object is to provide a cartridge type of casing applied to the steering arm of an automobile and within said casing the universal joint and take up means are located, eliminating the usual arrangement of separate joint for the stud of the stud and ball member. In my present construction the other end of the ball stud is turned at right angles and connected to the tie rod. Moreover, in this construction, I utilize a very satisfactory construction whereby a minimum of parts is used and a reduction in cost attained, at the same time producing a simplified joint arranged for automatic take up upon compensation for wear of the parts in use; a joint in which unitary ball seats and take up means are provided, the same being constructed and arranged in such a manner as to afford an excellent method of manufacture; a construction in which the assembly provides a unique and simplified method of operation facilitating both the action in use and the automatic wear compensation as indicated; novel spring urging means and the assembly thereof in the joint; and a simplification of the various cooperating parts and elements of the joint construction, which are easily made and easily assembled, providing an over all joint construction which is very efficient both in its method of manufacture and in its construction and operation.

Further objects and advantages are within the scope of my invention such as relate to the arrangement, operation, and function of the related elements of the structure, to various details of construction and to combinations of parts, elements per se, and to economies of manufacture and numerous other features as will be apparent from a consideration of the specification and drawing of a form of the invention, which may be preferred, in which:

Figure I is an elevation of the assembled joint with certain operating parts shown in section;

Figure II is a top plan view showing the connection with the steering knuckle of the automobile and Figure III is an isometric view of the cartridge or housing for retaining the universal joint.

Referring to Figures I and II, I provide the steering arm 5 of the vehicle with a cylindrical opening 6 at the enlarged end or boss 8 thereof. In the universal joint herein disclosed, the cartridge or stamping 10 has a straight cylindrical inner bore 11 therein and has an internal retaining flange 12 at one end having an opening therethrough for the reception of the take up mechanism and the ball of the ball stud. The inner cylindrical surface 11 of the shell or cartridge 10 may be easily but very accurately made in my arrangement as is necessary since it receives the main working parts of the joint, whereas fitting the shell 10 into the bore 6 of the boss 8 of the steeering knuckle arm 5 merely requires a stationary connecting fit. Integral washer retaining means 15 is formed at the other end of shell 10 for the spring retainer or washer 13 and by offsetting this end of the stamping 10, I also provide a ledge 16 so that the shell 10 rests upon the upper side of the boss 8 and can not slip down through the opening 6 in the boss.

In Figure I, I have illustrated a ball and curved ball stud member 18, the stud being threaded at 19 to be held in place by suitable clamps 19' to a tie rod 17 of the steering mechanism of the vehicle. The ball stud carries at its other end, in the form illustrated in Figure I, a ball 20.

The construction of the unitary combined ball seat and take up members 25 and 26 together with the assembly thereof, is here constructed by making the parts from a ring 30 as illustrated in my copending case, "Joint construction and method of making the same," filed July 31, 1944, Serial No. 547,453. This ring is either screw machined or cold coin pressed to form the shape having a cylindrical bore extending from the top down to less than half the distance of the length of the ring while the lower part is arranged to provide spherically shaped ball seating surfaces 32 spaced from the end of the ring as shown. This ring is then cut in two longitudinally, thereby forming in halves the two unitary ball seats and take up members 25 and 26 assembled as shown with transposed ends, one in relation to the other as this illustrates the manner in which they are assembled in the joint. It will be noted that the ring has a cylindrically shaped outer surface, corresponding to the size of and adapted to fit the cylindrical bore 11 of the shell 10.

The simplified manner in which these unique, combined ball seats and adjusting or take up members 25 and 26 are located and assembled in the shell 10 includes the use of spring means to constantly urge each of the operating parts of the joint into close contacting fit throughout their use. To this end, I use different types of springs as means for producing this result, such as a correctly formed wire spring but have found satisfactory a leaf type spring 34 which has the main spring portion 35 and the accurately formed and shaped true design ears 36 and 37, these two ears adapted, when the joint is assembled as shown in Figure I, to contact the upper edge 32' or front face of the rim of the ball seat 25, this arrangement preventing the spring from rotating out of correct position in use.

In assembling the joint as shown in Figure I, it will be noted that the reversely arranged halves of the ring 30, constituting the ball seat take up units 25 and 26, are positioned so that the bottom edge of seat 26 contacts the overhanging flange 12 of the shell 10 at 26', as indicated, while space 25' is provided between the bottom end of the other ball seat member 25 and said flange 12. The spring 34 held in place by the spring retaining washer 13, bears against the upper end of each of said ball seats as shown and constantly urges the seat 25 downwardly (in the particular position illustrated in Figure I) while at the same time ball 20 is forced by spring 34 into contact with the thick end or bearing portion of the other seat 26 which is also held in contact at 26' with the housing flange 12 by the same spring 34. The retaining washer 13 upon which spring 34 seats, is securely held in position by the turned over flange 15 on the housing 10 and the arrangement firmly holds and maintains in close contact all parts of the joint in its assembled and operating position.

By this unique construction and assembly it will be seen that I use the steering arm 5 of the automobile to directly carry the ball 20 and universal joint rather than for receiving the stud of the joint construction; that the steering arm 5 with enlarged head 8 is merely provided with a straight cylindrical bore 6 therethrough requiring no special finish and through which the cartridge 10 is slipped and secured in place. A very compact assembly is thereby provided especially where a very limited space is allowed on the motor vehicle and a specially finished stud bearing connection with the automobile steering boss or head 8 is entirely avoided. In addition instead of requiring a special ball housing with a suitable extension connected thereto for uniting it with the tie rod, I here form a direct connection for the turned end 18 of the ball stud itself, with the tie rod 17 connecting the same thereto by screw threaded adjustment 19 and clamping means or lock 19' referred to supra. Moreover, by forming the ledge 16 at its upper end, the shell 10 rests upon the top surface of the boss 8 of the steering knuckle 5 and by providing the inturned flange 12 at the bottom end of the shell it will be seen that I have provided an important safety feature in that should anything happen to the ball seats, or various parts, et cetera, the ball 20 is nevertheless retained in the unit by flange 12 and could not slip or fall entirely out of the joint which in such a case would completely disconnect the steering mechanism and lead to the possibility of accident. By my construction this possibility is avoided.

The operation of the unitary take up and ball seats in use involves the maintenance of all parts continuously in accurate operating contact since the spring 34 acts so that the main line of pressure is at an angle and comes above and below the center line of the ball. As seat unit 26 contacts flange 12 at the line 26' it can not move upwardly but is resiliently held in contact with said flange by the spring 34 which forms a fulcrum for the action of the spring which at the same time, bearing against the retaining plate 13 presses against the upper end of the ball seat unit 25, constantly urging the latter downwardly in the particular arrangement here shown. Upon wear occurring, in view of the fact that the seat 26 is stationary, this seat 25 progresses into the space 25' at a rate twice that of the occurring wear, (assuming equal wear on both seats) as this movement compensates for the wear on both seats.

In the assembly as shown, the cylindrical formation of the cartridge 11 restrains the ball seats from outward movement when the spring 34 forces the thickened portion of ball seat 25 into the constricted annular space surrounding the ball at its horizontal equator and coincidentally forces the ball into contact with the thickened portion of the seat 26. In other words, in my construction one combined ball seat and take up unit 26 remains stationary while the other ball seat member 25 backed by the nonconverging cylindrical surface travels alone axially toward the end of the cylinder, thus maintaining the original alignment of the steering wheels.

Although other spring means are used, in the particular construction shown, the spring, in addition to being simple and cheap to manufacture, has two true design ears 36 and 37 which contact at their ends as shown in Figure II with the extending portion 32' of the ball seat 25 which prevents the spring from rotating out of correct position thereby facilitating and maintaining the correct operation in use of the take up between the ball and seats.

It is apparent that, within the scope of the invention, modifications and different arrangements may be made other than is herein disclosed, and the present disclosure is illustrative merely, the invention comprehending all variations thereof.

What I claim is:

1. A steering wheel arm fixed to a vehicle wheel, said arm having an enlarged boss with a vertically extending transverse opening in said boss; a tie rod universal joint assembly carried directly by said wheel steering arm, said assembly including a cylindrical shell fitting within said transverse opening in said arm, said shell having an external flange adjacent the upper end having a portion fitting against the outside upper surface of said boss surrounding said opening to prevent said joint from slipping downwardly through said boss; said shell having an inturned portion on the lower end thereof to provide a horizontal seat receiving flange; ball seat and take up members within said shell; a ball within said seats; said ball having a downwardly depending integral curved shank, said shank terminating in a longitudinal portion provided with screw threads for attachment to said tie rod, said ledge on said shell providing an opening larger than said shank but smaller than the ball, said seat members including a pair of oppositely arranged ball contacting seat portions, spring means within said shell at the opposite end from said ledge arranged to urge said ball and seat members continually into contact to take up for wear with a seat end in contact with said ledge and a plate for retaining said spring member in said shell.

2. A steering wheel arm fixed to a vehicle wheel, said arm having an enlarged boss with a vertically extending transverse cylindrical opening in said boss; a tie rod universal joint assembly carried directly by said wheel steering arm, said assembly including a cylindrical shell fitting within said transverse opening in said arm, said shell having an external flange adjacent the upper end having a portion fitting against the outside upper surface of said boss surrounding said opening to prevent said joint from slipping downwardly through said boss; said shell having an inturned portion on the lower end thereof to provide a horizontal seat receiving flange; ball seat take up members within said shell; a ball within said seats; said ball having a downwardly depending integral curved shank, said shank terminating in a longitudinal portion provided with screw threads for attachment to said tie rod, said ledge on said shell providing an opening larger than said shank but smaller than the ball, said seat members including a pair of oppositely arranged ball contacting seat portions, the seat portions of one of said members being located on one side of the equator of said ball and the seat contacting portion of the other member being located on the opposite side of the equator of said ball; spring means within said shell at the opposite end from said ledge arranged to urge said ball and seat members continually into contact to take up for wear with a seat end in contact with said ledge and fulcrumed thereby; and a plate for retaining said spring member in said shell.

WILLIAM A. FLUMERFELT.

REFERENCES CITED

The following references are of record in the file of this patent:

UNITED STATES PATENTS

| Number | Name | Date |
|---|---|---|
| 1,798,843 | Hufferd | Mar. 31, 1931 |
| 1,806,286 | Flumerfelt | May 19, 1931 |
| 1,828,891 | Crawford | Oct. 27, 1931 |
| 1,891,804 | Flumerfelt | Dec. 20, 1932 |
| 1,894,309 | Flumerfelt | Jan. 17, 1933 |

FOREIGN PATENTS

| Number | Country | Date |
|---|---|---|
| 350,186 | Great Britain | June 11, 1931 |
| 770,914 | France | Sept. 24, 1934 |